(12) United States Patent
Heikkilä

(10) Patent No.: US 12,126,283 B2
(45) Date of Patent: Oct. 22, 2024

(54) DOUBLE WINDING ELECTRIC MACHINE ASSEMBLY

(71) Applicant: ABB Schweiz AG, Baden (CH)

(72) Inventor: Samuli Heikkilä, Helsinki (FI)

(73) Assignee: ABB Schweiz AG, Baden (CH)

( * ) Notice: Subject to any disclaimer, the term of this patent is extended or adjusted under 35 U.S.C. 154(b) by 139 days.

(21) Appl. No.: 18/147,867

(22) Filed: Dec. 29, 2022

(65) Prior Publication Data
US 2023/0216438 A1     Jul. 6, 2023

(30) Foreign Application Priority Data
Jan. 3, 2022   (EP) .................................... 22150045

(51) Int. Cl.
| | | |
|---|---|---|
| *H02P 1/32* | (2006.01) | |
| *H02P 3/20* | (2006.01) | |
| *H02P 7/06* | (2006.01) | |
| *H02P 21/05* | (2006.01) | |
| *H02P 21/22* | (2016.01) | |
| *H02P 25/22* | (2006.01) | |
| *H02P 27/12* | (2006.01) | |

(52) U.S. Cl.
CPC .............. *H02P 21/05* (2013.01); *H02P 21/22* (2016.02); *H02P 25/22* (2013.01); *H02P 27/12* (2013.01)

(58) Field of Classification Search
CPC .......... H02P 21/05; H02P 27/12; H02P 25/22; H02P 21/22
USPC ....................................................... 318/496
See application file for complete search history.

(56) References Cited

U.S. PATENT DOCUMENTS

| | | | | |
|---|---|---|---|---|
| 6,149,544 A | * | 11/2000 | Masberg ................ | H02K 51/00 |
| | | | | 475/5 |
| 2015/0326166 A1 | * | 11/2015 | Hayashi .................. | H02P 27/08 |
| | | | | 318/503 |
| 2019/0058426 A1 | * | 2/2019 | Rothenhagen .......... | H02P 23/08 |

FOREIGN PATENT DOCUMENTS

JP       2006054992 A       2/2006

OTHER PUBLICATIONS

European Search Report; Application No. EP 22 15 0045; Issued: May 20, 2022; 1 Page.

* cited by examiner

*Primary Examiner* — Erick D Glass
(74) *Attorney, Agent, or Firm* — Whitmyer IP Group LLC

(57) ABSTRACT

A double winding electric machine assembly including a double winding electric machine having a first stator winding and a second stator winding; a first converter including a first modulator and a first power unit whose output is electrically connected to the first stator winding; a second converter including a second modulator and a second power unit whose output is electrically connected to the second stator winding. The assembly includes a current determining system adapted to determine at least one instantaneous phase current in the output of the first power unit; and a synchronizing system adapted to analyse ripple in the at least one instantaneous phase current, and to synchronize the first modulator with the second modulator by adjusting a phase shift between the first modulator and the second modulator until a minimum peak-to-peak current is obtained.

17 Claims, 1 Drawing Sheet

DOUBLE WINDING ELECTRIC MACHINE ASSEMBLY

TECHNICAL FIELD

The present invention relates to a double winding electric machine assembly.

BACKGROUND

A double winding electric machine has two separate stator windings. In a known assembly, each of the two separate stator windings is connected to a separate converter, wherein the separate converters are independently controlled such that they have own modulators.

One of the problems associated with the above known double winding electric machine assembly is that due to an inductive coupling between the two stator windings, asynchronous modulation of the two modulators increases current ripple in the two stator windings. The current ripple caused by the asynchronous modulation of the two modulators increases risk of overcurrent faults in transient states. Further, said current ripple may increase noise of the machine and energy losses of the machine assembly.

SUMMARY

An object of the present invention is to provide a double winding electric machine assembly so as to solve the above problem. The objects of the invention are achieved by a double winding electric machine assembly which is characterized by what is stated in the independent claim. The preferred embodiments of the invention are disclosed in the dependent claims.

The invention is based on the realization that modulators of the two converters can be synchronized by carrying out a ripple analysis relating to an instantaneous phase current in an output of one the two converters, and adjusting a phase shift between the two converters until a minimum peak-to-peak current is obtained. The minimum peak-to-peak current corresponds to a situation where pulse patterns of the modulators of the two converters overlap, and the two converters are synchronized with each other.

An advantage of the double winding electric machine assembly of the invention is that modulators of the two converters can be synchronized in a cost-effective way. In fact, some converters on the market have all the hardware required for realization of the synchronizing operation, wherein only new software is required for constructing a double winding electric machine assembly according to the invention from known hardware.

BRIEF DESCRIPTION OF THE DRAWINGS

In the following the invention will be described in greater detail by means of preferred embodiments with reference to the attached drawings, in which.

DETAILED DESCRIPTION

Figure 1:
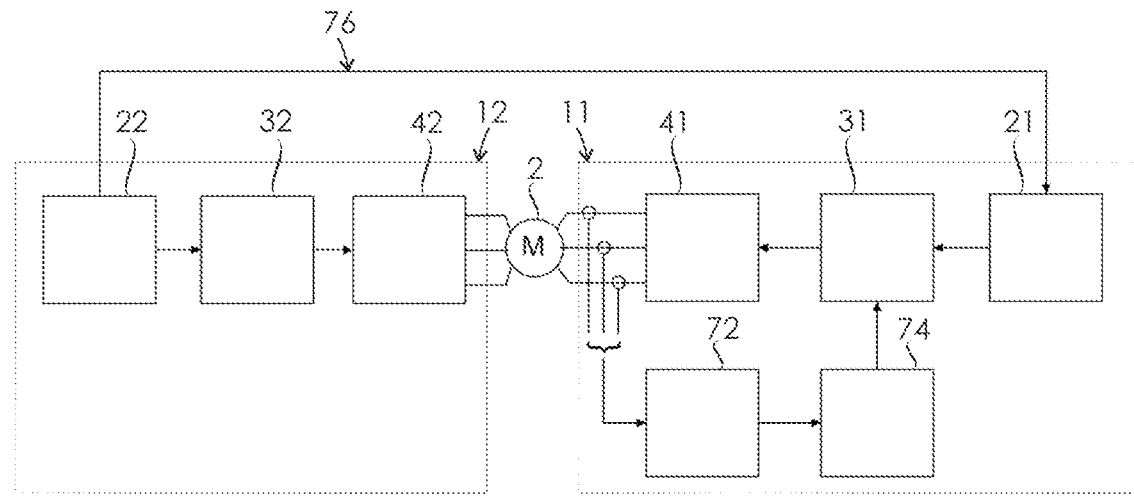
FIG. 1 shows a circuit diagram of a double winding electric machine assembly according to an embodiment of the present invention.

FIG. 1 shows a circuit diagram of a double winding electric machine assembly comprising a double winding electric machine 2, a first converter 11, a second converter 12, a current determining system 72, a synchronizing system 74 and a field orientation system 76. The double winding electric machine 2 has a first stator winding and a second stator winding. The first converter 11 comprises a first controller 21, a first modulator 31 and a first power unit 41. An output of the first power unit 41 is electrically connected to the first stator winding. The second converter 12 comprises a second controller 22, a second modulator 32 and a second power unit 42. An output of the second power unit 42 is electrically connected to the second stator winding.

The double winding electric machine 2 is a three-phase machine. In an alternative embodiment, the double winding electric machine is a multiphase machine having more than three phases.

The first stator winding and the second stator winding are star connected, and there is no phase shift between the first stator winding and the second stator winding. In an alternative embodiment, the first stator winding and the second stator winding are delta connected. In a further alternative embodiment, there is a small phase shift, for example thirty degrees, between the first stator winding and the second stator winding.

The first controller 21 is adapted to provide a first voltage reference signal to the first modulator 31, and the second controller 22 is adapted to provide a second voltage reference signal to the second modulator 32. The first voltage reference signal is a reference signal describing a fundamental wave the first power unit 41 is required to generate. The second voltage reference signal is a reference signal describing a fundamental wave the second power unit 42 is required to generate. Each of the first voltage reference signal and the second voltage reference signal is a vector that has a magnitude and direction.

Both the first power unit 41 and the second power unit 42 comprise a plurality of controllable semiconductor switches. The first power unit 41 is adapted to be controlled by the first modulator 31, and the second power unit 42 is adapted to be controlled by the second modulator 32.

The double winding electric machine 2 is adapted to operate both as a generator and as a motor. The first converter 11 and the second converter 12 are electrical devices that are adapted to operate as inverters when the double winding electric machine 2 operates as a motor, and as rectifiers when the double winding electric machine 2 operates as a generator. When the first converter 11 and the second converter 12 operate as inverters, they supply power to the first stator winding and the second stator winding. When the first converter 11 and the second converter 12 operate as rectifiers, they transfer power out of the first stator winding and the second stator winding. In an embodiment, the first converter and the second converter are frequency converters.

The current determining system 72 is adapted to determine a peak-to-peak current of an instantaneous phase current in each phase of the output of the first power unit 41. In an alternative embodiment, the current determining system is adapted to determine at least one instantaneous phase current in the output of the first power unit.

The synchronizing system 74 is adapted to analyse ripple in the instantaneous phase currents determined by the current determining system 72, and to synchronize the first modulator 31 with the second modulator 32 by adjusting a phase shift between the first modulator 31 and the second modulator 32 until a minimum peak-to-peak current is obtained in the instantaneous phase currents. Herein, the phase shift between the first modulator 31 and the second modulator 32 refers to a phase shift between carrier signals of the first modulator 31 and the second modulator 32.

In an embodiment, analysing ripple in the instantaneous phase currents is carried out by means of a signal calculated based on the instantaneous phase currents, like Clarke's or Parks's transformed xy or dq currents, or the amplitude of current vector, etc. Herein, analysing ripple in an instantaneous phase current comprises both analysing the instantaneous phase current directly and analysing the instantaneous phase current indirectly by means of a signal formed based on the instantaneous phase current.

The first modulator 31 and the second modulator 32 are adapted to carry out pulse-width modulation (PWM). Therefore, the synchronizing system 74 is adapted to synchronize PWM pulse patterns in the first stator winding and the second stator winding.

Frequencies of the carrier signals of the first modulator 31 and the second modulator 32 are the same. In an embodiment, a frequency of the carrier signals is greater than or equal to 1 kHz.

The synchronizing system 74 is adapted to analyse ripple in the instantaneous phase currents by providing an analysing operation comprising generating a series of test current pulses by the first power unit 41 to the first stator winding, wherein the series of test current pulses comprises a plurality of test current pulses whose phase shifts differ from each other. The first modulator 31 is synchronized with the second modulator 32 by adjusting the phase shift between the first modulator and the second modulator 32 to correspond a phase shift of the test current pulse whose peak-to-peak value is smallest.

During the analysing operation, a series of current pulses is generated by the second power unit 42 to the second stator winding. In an embodiment, the series of current pulses generated by the second power unit is identical to the series of test current pulses generated by the first power unit, and only a phase of the first modulator is adjusted while a phase of the second modulator is kept constant.

Phase shifts of the plurality of test current pulses are in a range of 0 to $T_{mcc}$, wherein $T_{mcc}$ is a period of a carrier cycle of the first modulator 31. The plurality of test current pulses comprises a first test current pulse and a second test current pulse such that a difference between phase shifts of the second test current pulse and the first test current pulse is greater than or equal to 50% of the period of the carrier cycle of the first modulator 31.

In theory, it is possible to use two test current pulses such that a phase shift of the first test current pulse is zero, and a phase shift of the second test current pulse is 0.5 $T_{mcc}$, for example. However, in general, increasing a number of test current pulses improves results of the analysing operation. In an embodiment, the test current pulses are uniformly pitched such that phase shifts between successive test current pulses are equal.

In an embodiment, the series of test current pulses in the analysing operation comprises current pulses whose phase shifts differ from each other, but which are in other respects normal current pulses generated by the first power unit to the first stator winding. Therefore, the analysing operation does not require interrupting normal operation of the double winding electric machine. Referring to the above-mentioned embodiment in which only two test current pulses are used in the analysing operation, the first test current pulse may actually be a normal current pulse with an unchanged phase, and the second test current pulse may be a normal current pulse with a phase shift compared to the first test current pulse. There is no need to modify current pulses generated by the second power unit to the second stator winding since the necessary phase shift is achieved by changing the phase of the current pulses generated by the first power unit to the first stator winding.

The synchronizing system 74 is adapted to carry out the analysing and synchronizing operations in connection with a start-up of the assembly. Typically, the phase shift between the first modulator and the second modulator is caused by properties of hardware in the assembly, so it is not required to continuously adjust the phase shift between the first modulator and the second modulator during normal operation of the double winding electric machine assembly. Nonetheless, in an embodiment, the synchronizing system is adapted to carry out the analysing and synchronizing operations once in a while during normal operation of the double winding electric machine assembly in order to fine-tune the phase shift. It should be noticed that since the test current pulses inherently cause some interference in the assembly, a frequent use of the analysing operation during normal operation of the double winding electric machine might be disadvantageous.

The current determining system 72 and the synchronizing system 74 are located in the first converter 11. The current determining system 72 comprises a current sensor for each output phase of the first power unit 41. The current determining system 72 and the synchronizing system 74 are communicatively connected to each other. The synchronizing system 74 is realized by software.

Figure 2:
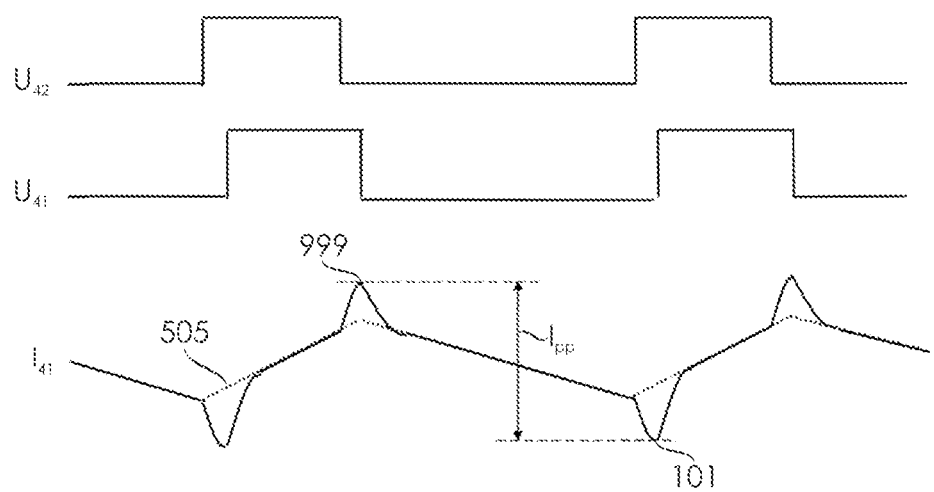
FIG. 2 shows voltages of outputs of first and second power units of the assembly shown in FIG. 1, and a current of the output of the first power unit in a situation in which the voltage of the output of the first power unit lags the voltage of the output of the second power unit.

FIG. 2 shows a voltage $U_{42}$ of the output of the second power unit 42, a voltage $U_{41}$ of the output of the first power unit 41, and a current $I_{41}$ of the output of the first power unit 41. The voltage $U_{41}$ lags the voltage $U_{42}$. The current determining system 72 is adapted to determine the peak-to-peak currents of the instantaneous phase currents directly by measuring a difference between a positive peak 999 and a negative peak 101 in each phase current as illustrated in FIG. 2. The peak-to-peak current is denoted by $I_{pp}$.

In FIG. 2, a dotted line SOS illustrates a "normal modulation ripple" that is also present in a corresponding single wound three phase machine. The normal modulation ripple is usually modelled and taken into account in a controller. The phase shift adjustment of present invention does not affect the normal modulation ripple, but it minimizes additional ripple caused by the asynchronous modulation of the first modulator and the second modulator.

The synchronizing method according to present invention works regardless of whether the voltage of the output of the first power unit lags or is ahead of the voltage of the output of the second power unit. There are two main reasons for this. Firstly, in a three-phase double winding electric machine, a zero-sequence current is zero, so in a phase, a current peak resulting from pulse edges occurring at different times shows as opposite current peaks in the two other phases. Therefore, a worst-case peak-to-peak current is always present in one of the phases regardless of a direction of a pulse edge or a lag. Secondly, an amplitude of the additional ripple caused by the asynchronous modulation of the first modulator and the second modulator is typically substantially greater than an amplitude of the normal modulation ripple, so current peaks of the additional ripple can be detected regardless of their direction.

In the embodiment shown in FIG. 1, the current determining system 72 is adapted to determine the peak-to-peak currents of the instantaneous phase currents directly by measuring a difference between a positive peak and a negative peak in each phase current as illustrated in FIG. 2. In an alternative embodiment, peak-to-peak currents are not measured directly, but ripple in the output current of the first power unit is analysed some other way, for example by analysing a time derivative of at least one instantaneous phase current of the first power unit.

In an embodiment, in which the synchronizing system is adapted to analyse said time derivative, the minimum peak-to-peak current is obtained by adjusting the phase shift between the first modulator and the second modulator until an average of an absolute value of the time derivative reaches its minimum. This embodiment seeks to smooth output currents of the power units, and it works irrespective of whether additional peaks caused by asynchronous modulation of the two modulators increase a total amplitude of the current, as in FIG. 2, or not.

The first converter 11 and the second converter 12 are identical with each other, and one of the converters is configured as a master converter, and the other converter is configured as a follower converter. Only one of the synchronizing systems is active at a time.

The field orientation system 76 is adapted to synchronize field orientations of the first converter 11 and the second converter 12. The field orientation system 76 is communicatively connected to the first controller 21 and the second controller 22. The field orientation system 76 is adapted to synchronize clocks of the first controller 21 and the second controller 22.

It will be obvious to a person skilled in the art that the inventive concept can be implemented in various ways. The invention and its embodiments are not limited to the examples described above but may vary within the scope of the claims.

The invention claimed is:

1. A double winding electric machine assembly comprising:
    a double winding electric machine having a first stator winding and a second stator winding;
    a first converter comprising a first controller, a first modulator and a first power unit, wherein an output of the first power unit is electrically connected to the first stator winding;
    a second converter including a second controller, a second modulator and a second power unit, wherein an output of the second power unit is electrically connected to the second stator winding;
    wherein the assembly includes:
        a current determining system adapted to determine at least one instantaneous phase current in the output of the first power unit; and
        a synchronizing system adapted to analyse ripple in the at least one instantaneous phase current determined by the current determining system, and to synchronize the first modulator with the second modulator by adjusting a phase shift between the first modulator and the second modulator until a minimum peak-to-peak current is obtained in the at least one instantaneous phase current.

2. The double winding electric machine assembly according to claim 1, wherein the synchronizing system is adapted to analyse ripple in the at least one instantaneous phase current determined by the current determining system by analysing a time derivative of the at least one instantaneous phase current, and to detect a ripple caused by the phase shift between the first modulator and the second modulator based on said derivative analysis.

3. The double winding electric machine assembly according to claim 2, wherein the synchronizing system is adapted to obtain the minimum peak-to-peak current by adjusting the phase shift between the first modulator and the second modulator until an average of an absolute value of the time derivative reaches its minimum in an analysis period.

4. The double winding electric machine assembly according to claim 1, wherein the current determining system is adapted to determine peak-to-peak values of an instantaneous phase current of at least one phase of the output of the first power unit.

5. The double winding electric machine assembly according to claim 1, wherein the synchronizing system is adapted to analyse the ripple in the at least one instantaneous phase current by providing an analysing operation including generating a series of test current pulses by the first power unit to the first stator winding, wherein the series of test current pulses includes a plurality of test current pulses whose phase shift differ from each other.

6. The double winding electric machine assembly according to claim 1,
    wherein the current determining system is adapted to determine peak-to-peak values of an instantaneous phase current of at least one phase of the output of the first power unit,
    wherein the synchronizing system is adapted to analyse the ripple in the at least one instantaneous phase current by providing an analysing operation generating a series of test current pulses by the first power unit to the first stator winding, wherein the series of test current pulses includes a plurality of test current pulses whose phase shift differ from each other, and
    wherein the first modulator is synchronized with the second modulator by adjusting the phase shift between the first modulator and the second modulator to correspond a phase shift of the test current pulse whose peak-to-peak value is smallest.

7. The double winding electric machine assembly according to claim 5, wherein the synchronizing system is adapted to carry out the analysing operation in connection with a start-up of the assembly.

8. The double winding electric machine assembly according to claim 5, wherein phase shifts of the plurality of test current pulses are in a range of 0 to $T_{mcc}$, wherein $T_{mcc}$ is a period of a carrier cycle of the first modulator.

9. The double winding electric machine assembly according to claim 8, wherein the plurality of test current pulses comprises a first test current pulse and a second test current pulse such that a difference between phase shifts of the second test current pulse and the first test current pulse is greater than or equal to 50% of the period $T_{mcc}$ of the carrier cycle of the first modulator.

10. The double winding electric machine assembly according to claim 1, wherein the assembly comprises a field orientation system adapted to synchronize field orientations of the first converter and the second converter.

11. The double winding electric machine assembly according to claim 10, wherein the field orientation system is communicatively connected to the first controller and the second controller, and is adapted to synchronize clocks of the first controller and the second controller.

12. The double winding electric machine assembly according to claim 1, wherein the first controller is adapted to provide a first voltage reference signal to the first modulator, and the second controller is adapted to provide a second voltage reference signal to the second modulator.

13. The double winding electric machine assembly according to claim 1, wherein the first converter comprises the current determining system and the synchronizing system.

14. The double winding electric machine assembly according to claim 1, wherein frequencies of carrier signals of the first modulator and the second modulator are the same, and they are greater than or equal to 1 kHz.

15. The double winding electric machine assembly according to claim 6, wherein the synchronizing system is adapted to carry out the analysing operation in connection with a start-up of the assembly.

16. The double winding electric machine assembly according to claim 6, wherein phase shifts of the plurality of test current pulses are in a range of 0 to $T_{mcc}$, wherein $T_{mcc}$ is a period of a carrier cycle of the first modulator.

17. The double winding electric machine assembly according to claim 7, wherein phase shifts of the plurality of test current pulses are in a range of 0 to $T_{mcc}$, wherein $T_{mcc}$ is a period of a carrier cycle of the first modulator.

* * * * *